United States Patent
Miyoshi et al.

(10) Patent No.: US 6,473,958 B2
(45) Date of Patent: Nov. 5, 2002

(54) MOTOR SHAFT FOR ROTATIONAL-TO-DIRECT MOTION CONVERTING MOTOR AND METHOD OF MANUFACTURING THE MOTOR SHAFT

(75) Inventors: Sotsuo Miyoshi, Tokyo (JP); Hisashi Yokoyama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/738,321

(22) Filed: Dec. 18, 2000

(65) Prior Publication Data

US 2001/0002546 A1 Jun. 7, 2001

Related U.S. Application Data

(63) Continuation of application No. PCT/JP00/02589, filed on Apr. 20, 2000.

(30) Foreign Application Priority Data

Apr. 20, 1999 (JP) ............................................. 11-112104

(51) Int. Cl.$^7$ ................................................ B23P 13/04
(52) U.S. Cl. .......................... 29/557; 29/412; 74/89.34; 74/89.37; 251/129.11
(58) Field of Search ................... 29/557, 412; 74/89.34, 74/89.37; 251/129.11; 72/338

(56) References Cited

U.S. PATENT DOCUMENTS

| | | | |
|---|---|---|---|
| 5,351,935 A | 10/1994 | Miyoshi et al. | |
| 5,375,042 A | 12/1994 | Arima et al. | |
| 5,784,922 A | 7/1998 | Ozaki et al. | |
| 6,116,106 A | 9/2000 | Miyoshi | |
| 6,220,571 B1 * | 4/2001 | Kim et al. | 251/129.11 |
| D446,219 S * | 8/2001 | Miyoshi | 251/129.11 |

FOREIGN PATENT DOCUMENTS

| | | |
|---|---|---|
| JP | 61-245930 | 11/1986 |
| JP | 1-262038 | 10/1989 |
| JP | 7-23323 | 1/1995 |
| JP | 7-27023 | 1/1995 |
| JP | 7-39978 | 2/1995 |
| JP | 7-26041 | 5/1995 |
| JP | 8-49782 | 2/1996 |
| JP | 8-306418 | 11/1996 |
| JP | 10-215545 | 8/1998 |

* cited by examiner

Primary Examiner—David P. Bryant
(74) Attorney, Agent, or Firm—Sughrue Mion, PLLC

(57) ABSTRACT

A motor shaft for a rotational-to-direct motion converting motor has a rotation stopping portion formed in a plate shape, and a screw portion formed in a columnar shape. In addition, the motor shaft has a hole, arranged in an end portion of the motor shaft in a longitudinal direction of the motor shaft, for positioning the motor shaft in a form rolling. Therefore, a position shift or a phase shift of thread ridges formed on the screw portion can be prevented.

2 Claims, 13 Drawing Sheets

FIG.3A    FIG.3B    FIG.3C
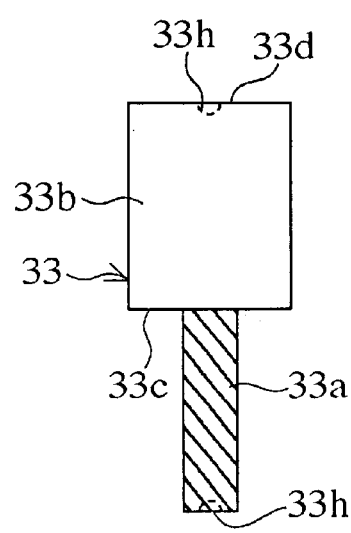 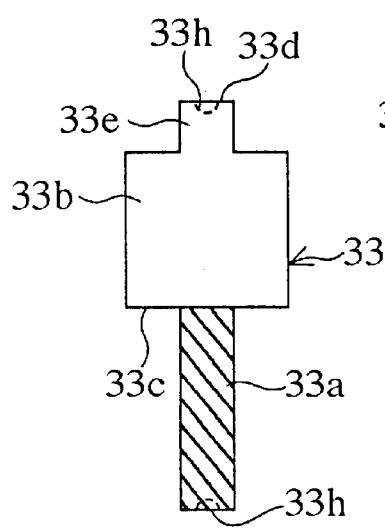 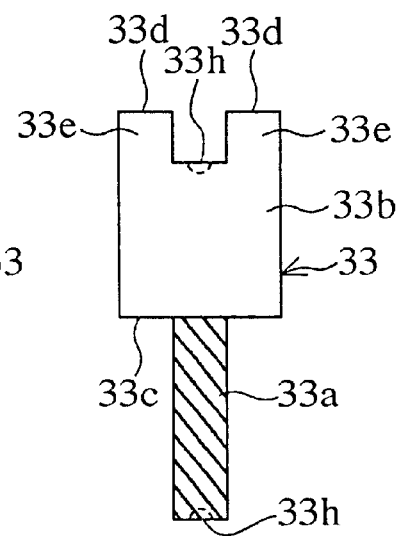
FIG.3D    FIG.3E    FIG.3F
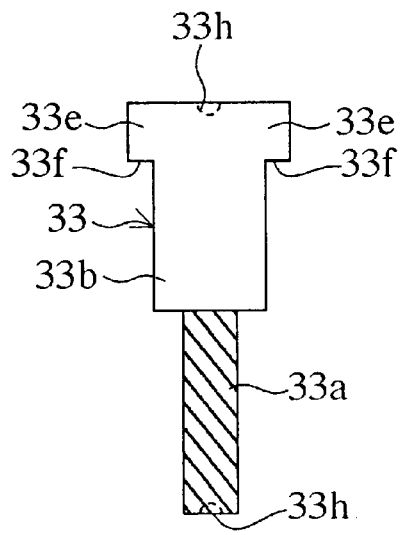 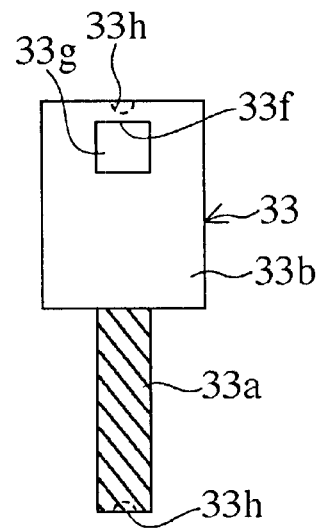 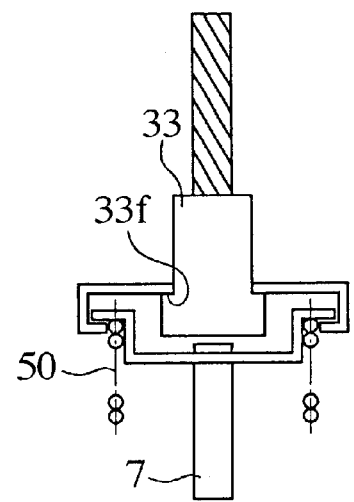

LARGE DIAMETER PORTION

TAKEN-OUT REFUSE

33h

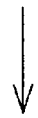

MOTOR SHAFT FOR ROTATIONAL-TO-DIRECT MOTION CONVERTING MOTOR AND METHOD OF MANUFACTURING THE MOTOR SHAFT

CROSS-REFERENCE TO THE RELATED APPLICATION

This application is a continuation of International Application No. PCT/JP00/02589, whose International filing date is April 20, 2000, the disclosures of which Application are incorporated by reference herein.

BACKGROUND OF THE INVENTION

1. Field of the Invention

The present invention relates to a motor shaft for a rotational-to-direct motion converting motor which is, for example, used for a valve (EGR-V) of an exhaust gas re-circulation system and has a mechanism for converting a rotational motion of a valve motor into a reciprocating motion (or a direct driving motion). Also, the present invention relates to a method of manufacturing the motor shaft.

2. Description of Related Art

As is disclosed in the Published Unexamined Japanese Patent Application H7-27023 (1995), an apparatus for controlling an exhaust gas re-circulation control valve (EGR-V) has been known as a prior art. In this control apparatus, a rotational motion in a stepping motor (or a linear motor) is converted into a linear motion, the EGR-V is driven, a valve opening is adjusted, and a flow rate of a re-circulated exhaust gas is adjusted. Also, a pushing type control valve, in which a motor shaft pushes a valve shaft to open a valve, and a lifting type control valve, in which a motor shaft pulls a valve shaft to open a valve, are disclosed in the Application.

Also, in the Published Unexamined Japanese Patent Application H8-49782 (1996), a technique, in which a compression molding is performed while arranging a non-protruding end of a screw shaft between metal molds, is disclosed as a processing method in the Application. Also, in the disclosure of the Application, the use of another processing method is allowed on condition that no flash is produced on a surface of an engaging-protruding portion in the processing method. Also, a mechanism, in which a motor shaft and a valve-shaft are integrally formed with each other to fix a valve to an end portion of the motor shaft, is disclosed.

In addition, in the Published Unexamined Japanese Patent Application H10-215545 (1998), a technique, in which a round bar is formed into a motor shaft by grinding the round bar with a finishing machine, and a technique, in which a motor shaft is molded according to a metal injection molding method, are disclosed. Also, a technique, in which a screw portion is formed according to a form rolling method, a rotation regulating portion adapted to a phase (or lead and pitch) of the screw portion is formed according to a resin inserting molding or a metal injection molding and the rotation regulating portion and the screw portion are welded together to form a motor shaft, is disclosed.

Here, a structure of a general EGR-V is described.

FIG. 1 is an internal structural diagram of a stepper motor driving type exhaust gas re-circulation control valve which denotes a motor-driven control valve apparatus and in which a stepper motor is used as a motor.

In FIG. 1, a housing 1 has an input port 2 leading to an exhaust system of an engine, an output port 3 leading to an intake system of the engine, a pair of reflux passages 4a and 4b, and a water-cooling passage 14 for cooling the motor and a valve body. A valve seat 6 is inserted into the reflux passage 4a under pressure, and a roll pin 13 prevents the valve seat 6 from coming out from the reflux passage 4a. 9 indicates a bush functioning as a bearing. 8 indicates a holder which prevents deposits from penetrating into the bush 9. The holder 8 is arranged with the valve seat 6 on the same axis and is placed between the housing 1 and the valve seat 6.

5 indicates a valve which is arranged to come in contact with the valve seat 6. The valve 5 is fixed to a valve shaft 7 at caulking structure. The valve shaft 7 penetrates through the bush 9, a spring holder A10 and a washer 13 are fixed to the valve shaft 7 at caulking structure on the opposite side to the valve 5. 12 indicates a spring A which is arranged between the spring holder A10 and the housing 1 at a contracted form so as to give a power to the valve 5 in a valve-close direction.

20 indicates a stepper motor. An attaching screw 46 attaches the stepper motor 20 to the housing 1 so as to make an axis center of the stepper motor 20 agree with that of the housing 1. 22 indicates a pair of bobbins. A coil 23 is wound on each bobbin 22. A yoke A24 and a yoke B25 functioning as a magnetic path are arranged on the outer periphery of each bobbin 22. 29 indicates a terminal electrically connected with the coils 23. A connector is formed of the terminal 29 and a motor housing 21. 27 indicates a plate A magnetically shielding one coil portion from the other coil portion. 26 indicates a plate B which prevents resin from flowing into the inner peripheries of the coil portions when the motor housing 21 is formed.

31 indicates a magnet. 32 indicates a rotor having the magnet 31. A screw portion 32a and a stopper portion 32b for stopping the movement of a motor shaft 70 in a longitudinal direction are arranged in the inner periphery of the rotor 32. The screw portion 32a is screwed to a screw portion 70a of the motor shaft 70. 30 indicates a pair of bearings attached to both ends of the rotor 32. 28 indicates a plate spring generating a side pressure given to the bearings 30. 70 indicates the motor shaft having the screw portion 70a. The screw portion 70a is screwed to the screw portion 32a so as to make the motor shaft 70 perform a reciprocating motion, so that a rotational motion performed in the rotor 32 is converted into a linear motion of the motor shaft 70. 34 indicates a stopper pin inserted into the motor shaft 70 under pressure. 41 indicates a motor bush having a bearing function and a rotation preventing function for preventing the rotational motion of the motor shaft 70. The rotation preventing function is generated by a hole of the motor bush 41 having a D form at cross section. 40 indicates a motor holder having the same center as that of the motor housing 21. The motor holder 40 is arranged between the motor housing 21 and the housing 1 and holds the bearings 30 and the motor bush 41.

In the motor having the above configuration, in a valve opening operation, the rotor 32 including the magnet 31 is rotated in a valve-open direction step by step according to a pulse-shaped voltage signal which is sent from a control unit (not shown) to the terminal 29. In this case, the number of transmitted pulses agrees with the number of stepped motions of the rotor 32, so that an open loop control can be correctly performed. This step-by-step rotation of the rotor 32 is transmitted to the motor shaft 70 through the screw portion 32a of the rotor 32 and the screw portion 70a of the motor shaft 70. Because a rotational motion in the motor shaft 70 is prevented by both a D portion 70b of the motor shaft 70 having a semi-circular shape at cross section and a D hole of the bush 41, the rotational motion of the rotor 32 is converted into a linear motion of the motor shaft 70, and the motor shaft 70 is moved in a valve-open direction (that is, in the lower direction in FIG. 1).

Because a conventional motor shaft for a rotational-to-direct motion converting motor has the above configuration, it is difficult to perform the positioning of the motor shaft 70 in the form rolling, and there is a case where the screw portion is not correctly positioned.

Also, a rotation stopping portion (that is, the D portion 70*b*) of the motor shaft 70 is made of a material other than that of the motor shaft 70 to adapt the phase of one screw portion 32*a* to that of the other screw portion 70*a*, and one screw portion 70*a* is fixed to the rotation stopping portion to make the phase of the screw portion 70*a* agree with that of the rotation stopping portion. Therefore, there is a problem that the number of parts of the motor shaft 70 is increased and the processing procedure for the motor shaft 70 is complicated.

In addition, in the manufacturing method of the conventional motor shaft 70, because a round bar is formed into the conventional motor shaft 70 by grinding the round bar, a portion of the round bar removed in the grinding operation is drawn off as scrap metal. Therefore, there is another problem that an useless portion of the round bar removed as scrap metal is increased.

In particular, in cases where the rotation stopping portion of the motor shaft 70 is made of the same material as that of the motor shaft 70, it is required to form a round bar having a larger diameter into a motor shaft Therefore, an useless portion of the round bar is moreover increased.

SUMMARY OF THE INVENTION

The present invention is provided to solve the above problems, and an object of the present invention is to provide a motor shaft for a rotational-to-direct motion converting motor in which the positioning in a form rolling operation is easily performed and in which phases of screws connected to each other are easily adapted to each other.

Also, the object of the present invention is to provide a method of manufacturing the motor shaft in which a material of the motor shaft is efficiently used.

A manufacturing method of a motor shaft for a rotational-to-direct motion converting motor according to the present invention comprises a step for forming an end portion of a wire rod into a large diameter portion, a step for flattening the large diameter portion to form the large diameter portion into a plate portion having a prescribed thickness, a step for taking out a prescribed-shaped rotation stopping portion from the plate portion having the prescribed thickness, and a step for forming thread ridges on the wire rod other than the rotation stopping portion. Because the rotation stopping portion is formed after the wire rod is once formed into the large diameter portion, a diameter of the wire rod can be reduced.

Also, a manufacturing method of a motor shaft for a rotational-to-direct motion converting motor according to the present invention comprises a step for taking out a prescribed-shaped second plate material including a rotation stopping portion from a first plate material, a step for forming the second plate material other than the rotation stopping portion into a columnar portion by pressing the second plate material, and a step for forming thread ridges on the columnar portion. Because the thread ridges is formed after the second plate material is once formed into the columnar portion, the first plate material can be thinned.

Also, the step for forming thread ridges in the manufacturing method comprises a step for forming the thread ridges according to a form rolling. Therefore, the thread ridges can be rapidly formed.

Also, a motor shaft for a rotational-to-direct motion converting motor comprises a rotation stopping portion formed in a plate shape, a screw portion formed in a columnar shape, and a hole, arranged in an end portion of a motor shaft in a longitudinal direction, for positioning the motor shaft in a form rolling. Therefore, a position shift or a phase shift of the thread ridges formed on the screw portion can be prevented.

BRIEF DESCRIPTION OF THE DRAWINGS

FIG. 3A is a front view showing a motor shaft according to the first embodiment of the present invention;

FIG. 3B is a front view showing a motor shaft according to the first embodiment of the present invention;

FIG. 3C is a front view showing a motor shaft according to the first embodiment of the present invention;

FIG. 3D is a front view showing a motor shaft according to the first embodiment of the present invention;

FIG. 3E is a front view showing a motor shaft according to the first embodiment of the present invention;

FIG. 3F is a front view showing a motor shaft according to the first embodiment of the present invention;

DETAILED DESCRIPTION OF THE PREFERRED EMBODIMENTS

The invention will now be described with reference to the accompanying drawings.

Embodiment 1

Figure 2:
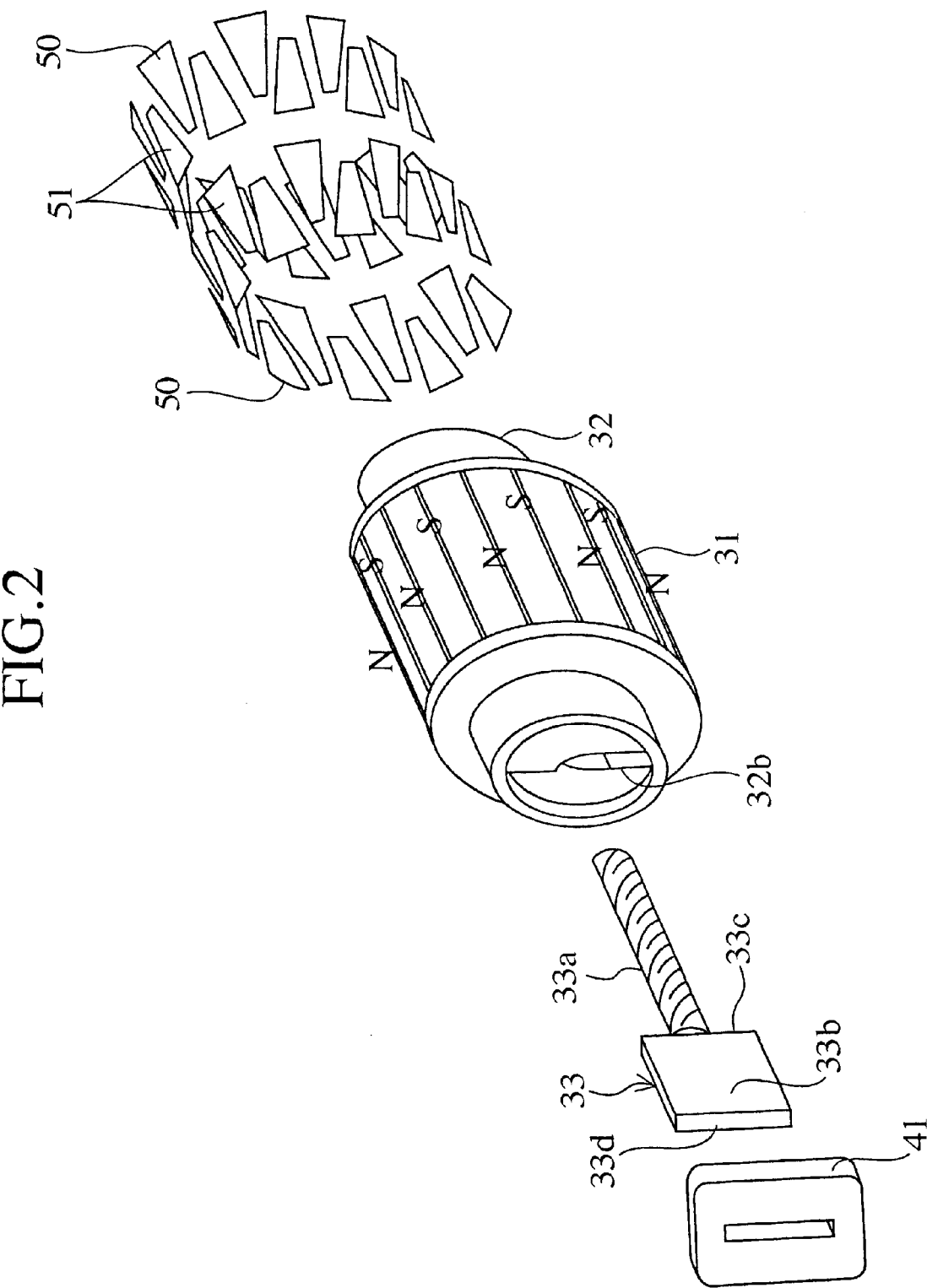
FIG. 2 is an exploded view in perspective of a main portion of a rotational-to-direct motion converting motor according to a first embodiment of the present invention.
Figure 4A:
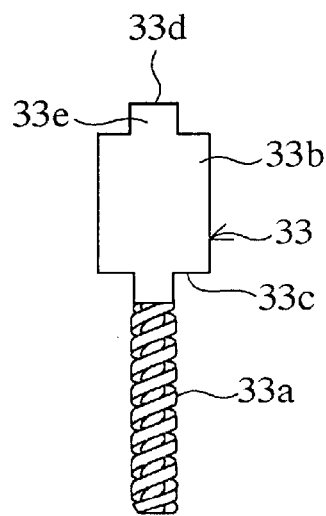
FIG. 4A is a front view of the motor shaft shown in FIG. 3B.
Figure 4B:
FIG. 4B is a right side view of the motor shaft shown in FIG. 3B.
Figure 4C:
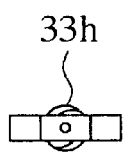
FIG. 4C is a plan view of the motor shaft shown in FIG. 3B.
Figure 4D:
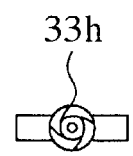
FIG. 4D is a bottom view of the motor shaft shown in FIG. 3B.
Figure 4E:
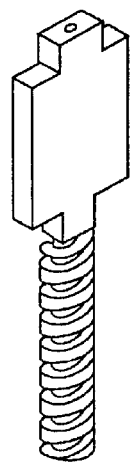
FIG. 4E is a diagonal view of the motor shaft shown in FIG. 3B.
Figure 5A:
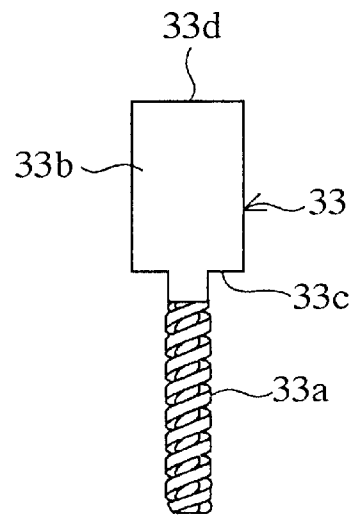
FIG. 5A is a front view of the motor shaft shown in FIG. 3A.
Figure 5B:
FIG. 5B is a right side view of the motor shaft shown in FIG. 3A.
Figure 5C:
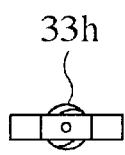
FIG. 5C is a plan view of the motor shaft shown in FIG. 3A.
Figure 5D:
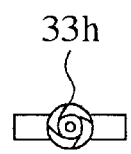
FIG. 5D is a bottom view of the motor shaft shown in FIG. 3A.
Figure 5E:
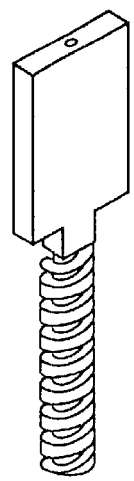
FIG. 5E is a diagonal view of the motor shaft shown in FIG. 3A.
Figure 6A:
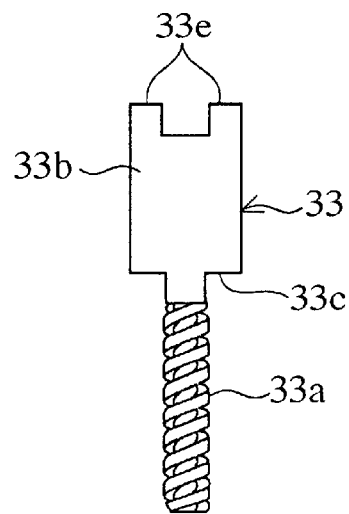
FIG. 6A is a front view of the motor shaft shown in FIG. 3C.
Figure 6B:
FIG. 6B is a right side view of the motor shaft shown in FIG. 3C.
Figure 6C:
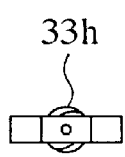
FIG. 6C is a plan view of the motor shaft shown in FIG. 3C.
Figure 6D:
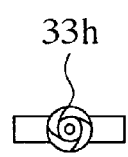
FIG. 6D is a bottom view of the motor shaft shown in FIG. 3C.
Figure 6E:
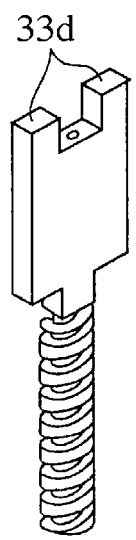
FIG. 6E is a diagonal view of the motor shaft shown in FIG. 3C.
Figure 7A:
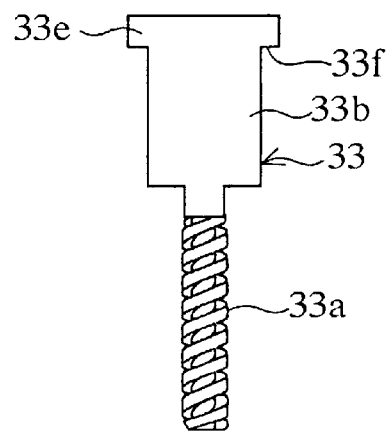
FIG. 7A is a front view of the motor shaft shown in FIG. 3D.
Figure 7B:
FIG. 7B is a right side view of the motor shaft shown in FIG. 3D.
Figure 7C:
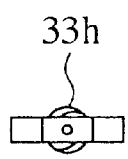
FIG. 7C is a plan view of the motor shaft shown in FIG. 3D.
Figure 7D:
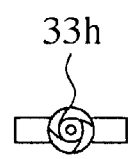
FIG. 7D is a bottom view of the motor shaft shown in FIG. 3D.
Figure 7E:
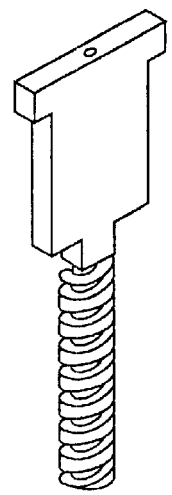
FIG. 7E is a diagonal view of the motor shaft shown in FIG. 3D.
Figures 8A, 8B, 8C, 8D:
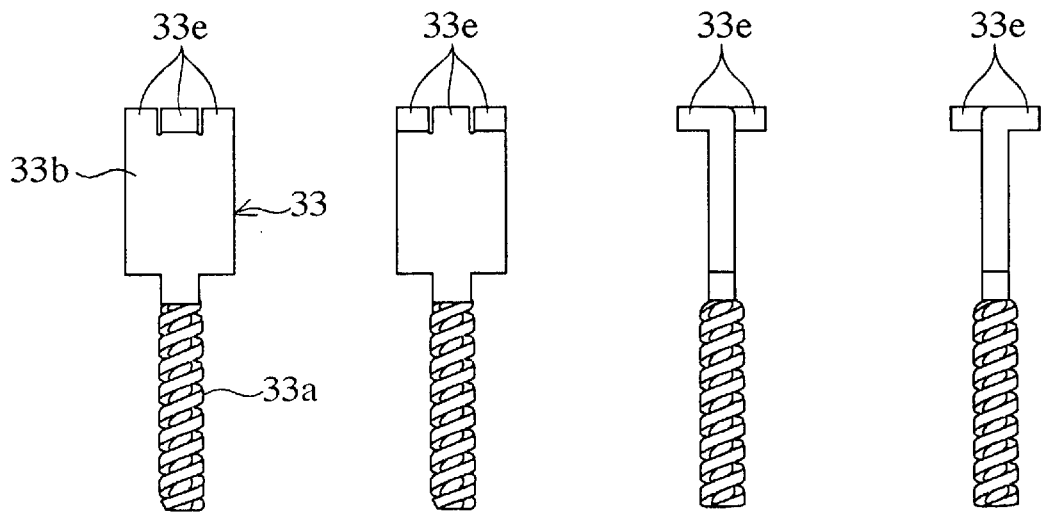
FIG. 8A is a front view showing a motor shaft according to the first embodiment of the present invention.
FIG. 8B is a back view of the motor shaft.
FIG. 8C is a left side view of the motor shaft.
FIG. 8D is a right side view of the motor shaft.
Figures 8E, 8F:
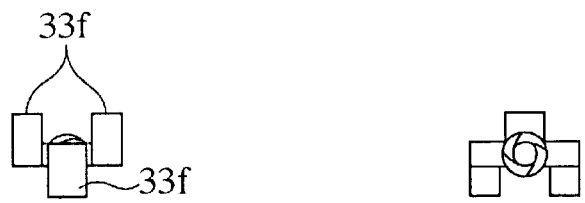
FIG. 8E is a plan view of the motor shaft.
FIG. 8F is a bottom view of the motor shaft.
Figure 8G:
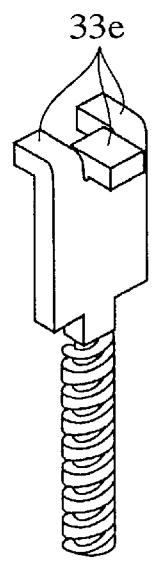
FIG. 8G is a diagonal view of the motor shaft.

FIG. 2 is an exploded view in perspective of a main portion of a rotational-to-direct motion converting motor according to a first embodiment of the present invention.

Figure 1:
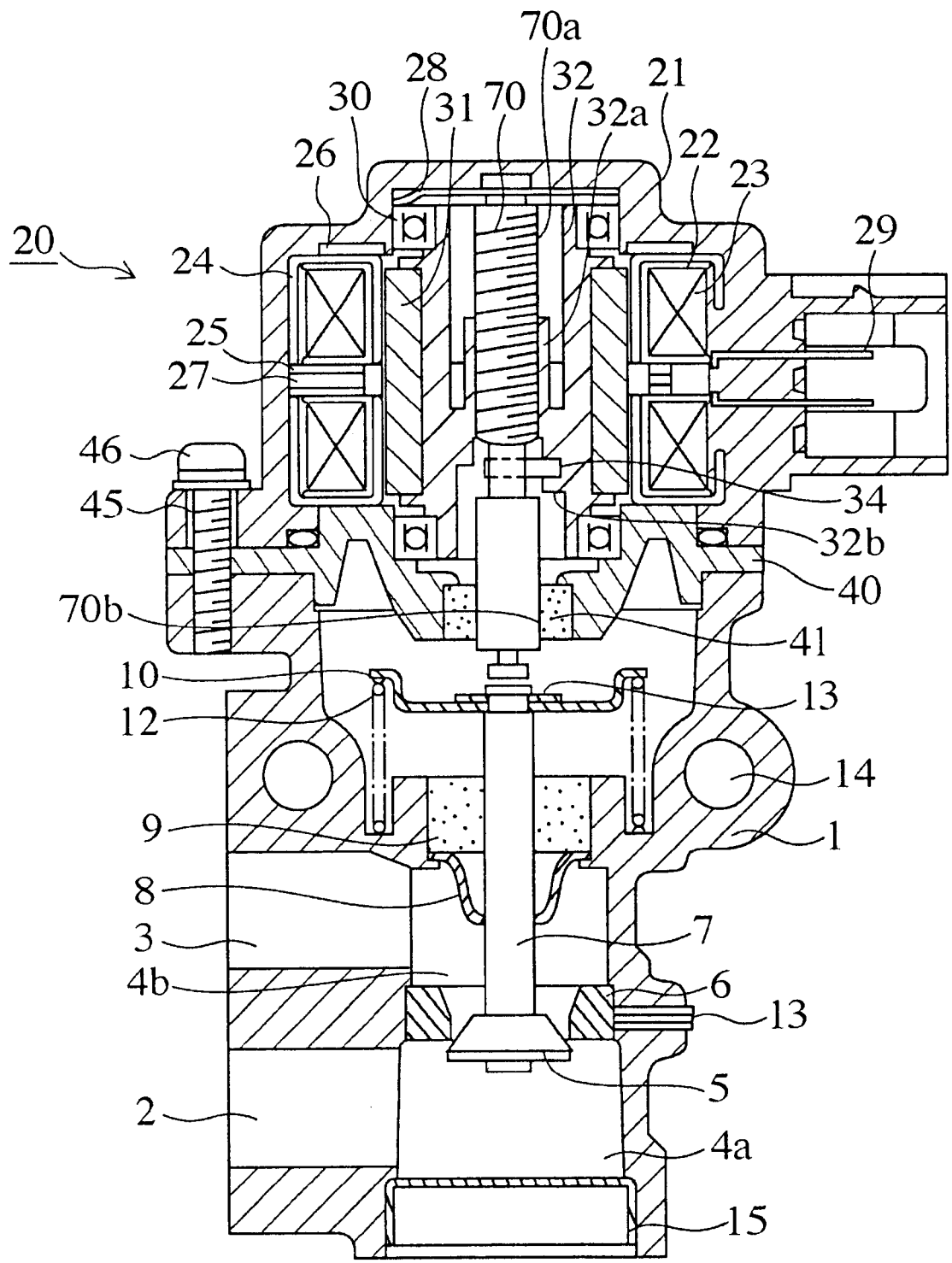
FIG. 1 is a cross sectional view showing a conventional exhaust gas re-circulation control valve with a rotational-to-direct motion converting motor.

In FIG. 2, 50 and 51 respectively indicate a stator formed of an iron core. A coil is wounded on each of the stators 50 and 51. 31 indicates a magnet formed of a permanent magnet. 32 indicates a rotor rotating according to a rotational power which is generated in the magnet 31 by magnetic field generated by supplying electric current to the stators 50 and 51. 32b indicates a stopper portion which is formed on an end side of the rotor 32 facing a valve shaft and functions as a stopper on the motor side of a motor shaft 33 (described later). 33 indicates the motor shaft comprising a screw portion 33a, a plate-shaped rotation regulating portion 33b and a pushing-out area 33d. The screw portion 33a is screwed to the rotor 32. The rotation regulating portion 33b regulates a rotational motion around an axis of the motor shaft 33. The pushing-out area 33d is arranged on one end of the motor shaft 33 in a longitudinal direction of the motor shaft 33. Also, a contact portion 33c is formed on a screw portion side of the rotation regulating portion 33b. The contact portion 33c is in contact with the stopper portion 32b of the rotor 32 to limit a motion of the motor shaft 33 in the longitudinal direction. The other configuration of a rotational-to-direct motion converting motor is the same as that shown in FIG. 1, so that the other configuration is not shown in FIG. 2.

In a phase matching (or a rotational direction matching) in the parts of the rotational-to-direct motion converting motor, a positional relationship of the stators 50 and 51 (pawl portions of the stators 50 and 51 are only displayed in FIG. 2) is determined by inserting convex portions arranged in the outer peripheries of the stators 50 and 51 into concave portions arranged in the outer peripheries of the stators 50 and 51 so as to make the phase of the stator 50 match with that of the stator 51. Also, in the forming of the motor housing 21, convex portions of a metal mold of the motor housing 21 and concave portions (or holes) of the stators 50 and 51 are placed to maintain the phases of the stators 50 and 51, so that the phases of the stators 50 and 51 match with each other. Thereafter, the motor housing 21 and the motor holder 40 are fixed to each other according to a convex-concave structure in the same manner. In addition, a positional relationship of the motor holder 40 and the motor bush 41 is determined according to an rectangular outer shape of the motor bush 41. In contrast, a phase of the rotor 32 and a phase of the magnet 31 are determined according to a convex-concave structure of both the rotor 32 and the magnet 31. That is, a phase of magnetic poles of the magnet 31 and a phase of the stopper portion 32b are determined, and a phase of the screw portion 32a is determined.

In addition, phases of function portions of the motor shaft 33 are determined. In detail, the motor shaft 33 structurally has the screw portion 33a and the plate-shaped rotation regulating portion 33b arranged on the motor output side, the flat-shaped contact portion 33c, which is in contact with the stopper portion 32b of the rotor 32, is formed on an end surface of the rotation regulating portion 33b placed on the screw portion side, and the motor shaft 33 has the pushing-out area 33d which is placed in the opposite direction to the screw portion 33a and is in contact with the valve shaft 7.

In this embodiment, the structure of the pushing-out area 33d of the motor shaft 33 has a flat shape having no concave or convex portion. However, it is applicable that the pushing-out area 33d have one of structures shown in FIG. 3A to FIG. 3F.

In FIG. 3A to FIG. 3F, the pushing-out area 33d formed in a flat shape is shown in FIG. 3A and FIG. 5A to FIG. 5E. The motor shaft 33 having the flat-shaped pushing-out area 33d can be easily formed according to a punching processing, so that the manufacturing of the motor shaft 33 can be easily performed.

Next, in FIG. 3B, FIG. 4A to FIG. 4E and FIG. 13, a protruding portion 33e is formed in an axial central area of the motor shaft 33, and the end surface of the protruding portion 33e functions as the pushing-out area 33d. This type of motor shaft 33 can be easily formed according to the punching processing, so that the manufacturing of the motor shaft 33 can be easily performed. Also, an area of the pushing-out area 33d coming in contact with the valve shaft 7 can be reduced, and a space adjacent to a contacting area of the motor shaft 33 with the valve shaft 7 can be reduced.

Also, in FIG. 3C and FIG. 6A to FIG. 6E, two protruding portions 33e are formed symmetrically with respect to the axis of the motor shaft 33, and the end surfaces of the protruding portions 33e function as the pushing-out area 33d. This type of motor shaft 33 can be easily formed according to the punching processing, so that the manufacturing of the motor shaft 33 can be easily performed. Also, an area of the pushing-out area 33d can be widened while manufacturing the lightweight motor shaft 33.

Here, in FIG. 3A to FIG. 3C, the motor shaft 33 used for a pushing-out type EGR-V, in which the valve 5 goes away from the valve seat 6 (that is, the valve 5 is opened) when the valve shaft 7 is pushed by the motor shaft 33, is shown. However, as a motor shaft 33 used for a type of EGR-V other than the pushing-out type EGR-V, a motor shaft 33 used for a lifting type EGR-V, in which the valve 5 goes away from the valve seat 6 when the valve shaft 7 is lifted by the motor shaft 33, is structurally described hereinafter.

In FIG. 3D and FIG. 7A to FIG. 7E, the motor shaft 33 has a T-shaped rotation regulating portion 33b, two lifting areas 33f of two protruding portions 33e are engaged with the valve shaft 7, and the valve shaft 7 is lifted by the motor shaft 33. This type of rotation regulating portion 33b can be easily formed according to the punching processing, so that the manufacturing of the motor shaft 33 can be easily performed.

Also, in FIG. 3E, a hole 33g is formed in the central area of the rotation regulating portion 33b, a lifting area 33f of the hole 33a is engaged with the valve shaft 7, and the valve shaft 7 is lifted by the motor shaft 33. This type of motor shaft 33 can be easily formed according to the punching processing, so that the manufacturing of the motor shaft 33 can be easily performed. Also, no protruding portion is arranged in the motor shaft 33, but the hole 33a is formed in the motor shaft 33. Therefore, a size of the motor shaft 33 can be reduced.

Also, in FIG. 8A to FIG. 8G, the end portion of the motor shaft 33 is bent in a radial direction (in this embodiment, the end portion is divided into three end portions, and each end portion is bent) of the motor shaft 33, so that three protruding portions 33e are formed. End surfaces of the three protruding portions 33e function as three lifting areas 33f. Also, in cases where a hole is formed in the motor bush 41 so as to make the screw-portion 33a of the motor shaft 33 pass through the hole, the parts can be easily assembled into the rotational-to-direct motion converting motor. This type of motor shaft 33 can be easily formed according to the punching processing and a bending processing, so that the manufacturing of the motor shaft 33 can be easily performed. Also, because the protruding portions 33e are formed on the flat surface side of the plate-shaped rotation regulating portion 33b, the shape of the motor shaft 33 is similar to a columnar shape. Therefore, the arrangement of the columnar-shaped rotor 32, the valve shaft 7 and the motor shaft 33 can be efficiently and easily determined. Also, the protruding portions 33e bent in the radial direction function so as to prevent the motor shaft 33 from coming off from the motor bush 41.

In addition, the motor shaft 33 shown in FIG. 8A to FIG. 8G can be used for the pushing-out type EGR-V. In this case, a contacting surface of the motor shaft 33 with the valve shaft 7 can be widened, the motor shaft 33 reliably comes in contact with the valve shaft 7 and can push the valve shaft 7.

Because the structure and function of the motor shaft 33 other than those of the motor shaft 33 used for the lifting type EGR-V are described in the Published Unexamined Japanese Patent Application H7-23323 (1995), a detailed description of the other structure and function of the motor shaft 33 is omitted. In brief, in the lifting type EGR-V, the valve shaft 7 is moved to the valve seat 6, the valve shaft 7 comes in contact with the valve seat 6, and the EGR-V is closed. In contrast, the valve shaft 7 is moved in a direction of the motor 20, the valve shaft 7 goes away from the valve seat 6, and the EGR-V is opened. To design the EGR-V so as to make the EGR-V be closed in the failure of the EGR-V, a spring is arranged to give a power to the valve shaft 7 so as to move the valve shaft 7 in a valve-close direction. Therefore, when the EGR-V is opened, it is required to make the motor shaft 33 lift the valve shaft 7 in a direction of the motor 20.

Also, as shown in FIG. 3F, the motor shaft 33 shown in FIG. 3D is used for the pushing-out type EGR-V. In this case, the motor shaft 33 is normally moved in the valve-close direction to push the valve shaft 7, so that the EGR-V is opened. Also, the motor shaft 33 is moved in the valve-open direction to close the EGR-V by using a spring power of a valve shaft spring 50. In cases where the closing of the EGR-V cannot be sufficiently performed, it is possible to design the motor shaft 33 so as to make the lifting area 33f forcibly lift the valve shaft 7, so that the EGR-V can be reliably set in a valve-close condition.

Therefore, in cases where the EGR-V cannot be closed by only the spring power of the valve shaft spring 50 because of the distortion of the valve shaft 7 or the like, a motor driving power given by the motor shaft 33 is added to the valve shaft 7, and the EGR-V can be forcibly closed. Therefore, the EGR-V excellent in fail safe can be obtained.

Here, in cases where a pushing-out area is arranged in the motor shaft 33, the lifting type EGR-V can be forcibly closed by the motor shaft 33 in the same manner as the pushing-out type EGR-V.

FIG. 9(a) to FIG. 9(f) are a plurality of explanatory views showing a series of manufacturing steps of the motor shaft shown in FIG. 3B.

Figure 9A:
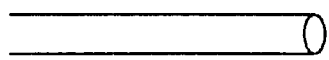
FIG. 9(a) to FIG. 9(f) are a plurality of explanatory views showing a series of manufacturing steps of the motor shaft shown in FIG. 3B.

In a step shown in FIG. 9(a), a wire rod, which has almost the same diameter as that of the screw portion 33a of the motor shaft 33, is initially prepared.

Figure 9B:
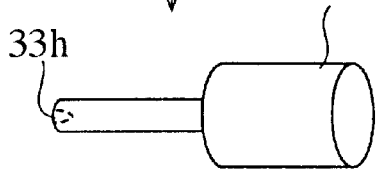

In a step shown in FIG. 9(b), the wire rod is cut to obtain a metal rod which has a length required to manufacture the motor shaft 33. In this case, a center hole 33h required for a form rolling operation is formed on an end surface of the metal rod placed on the side of the screw portion 33a. Also, a portion of the metal rod placed on the side of the rotation regulating portion 33b is pressed in a radial direction of the metal rod to form a large diameter portion. (header processing)

Figure 9C:

In a step shown in FIG. 9(c), the large diameter portion formed in the step shown in FIG. 9(b) is pressed in the radial direction by using an oil hydraulic pressing machine, so that the large diameter portion is flattened to the same thickness as that of the rotation regulating portion 33b. (flattening processing)

Figure 9D:
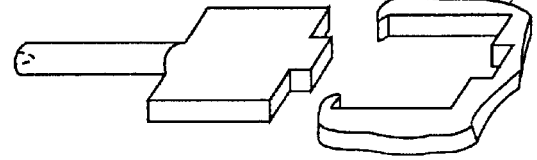

In a step shown in FIG. 9(d), a pattern-draw-molding is performed for the flattened portion obtained in the step shown in FIG. 9(c) by using the oil hydraulic pressing machine to form the rotation regulating portion 33b.

Figure 9E:

In a step shown in FIG. 9(e), a center hole 33h required for the form rolling operation is formed on the end surface of the rotation regulating portion 33b.

Figure 9F:
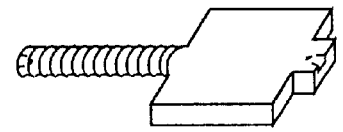

In a step shown in FIG. 9(f), the form rolling operation described later in detail is performed to roughly form the motor shaft 33, a barrel polishing is performed for the motor shaft 33 to remove flash from the motor shaft 33, and the motor shaft 33 is formed.

FIG. 10(a) to FIG. 10(e) are a plurality of explanatory views showing another series of manufacturing steps of the motor shaft different from that shown in FIG. 9(a) to FIG. 9(f).

Figure 10A:
FIG. 10(a) to FIG. 10(e) are a plurality of explanatory views showing another series of manufacturing steps of the motor shaft shown in FIG. 3B.

In a step shown in FIG. 10(a), a metal plate material, which has the same thickness as that of the rotation regulating portion 33b, is prepared.

Figure 10B:
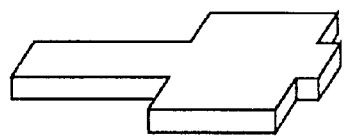

In a step shown in FIG. 10(b), an outlined motor shaft is taken out from the metal plate by using a power pressing machine. In this case, a portion of the outlined motor shaft corresponding to the rotation regulating portion 33b has the same shape as that of the rotation regulating portion 33b, and the other portion of the outlined motor shaft corresponding to the screw portion 33a has an excessive width required for a rolling step performed later.

Figure 12:
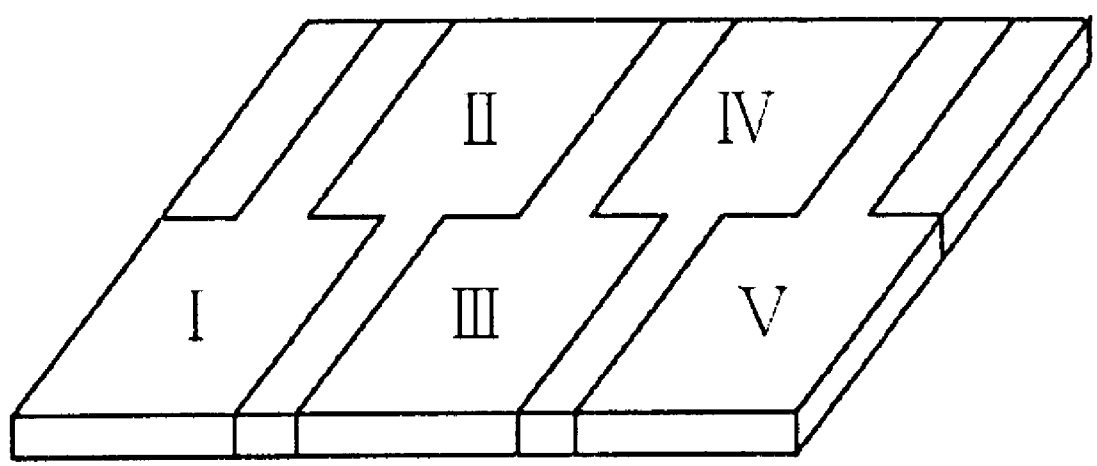
FIG. 12 is an explanatory view showing a cut-off of a material of each motor shaft from a plate material according to the first embodiment of the present invention.
Figure 13:
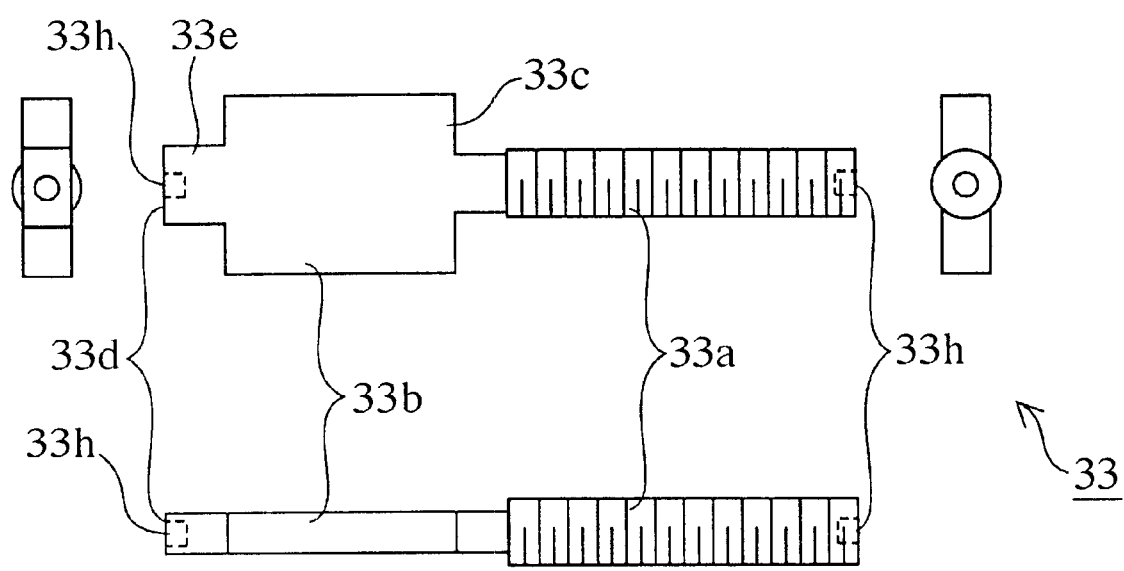
FIG. 13 is other front, plan, bottom and side views of the motor shaft shown in FIG. 3B.

Also, as shown in FIG. 12, in cases where a plurality of outlined motor shafts are taken out from the metal plate material while reducing a non-use portion of the metal plate material, the metal plate material can be effectively used.

Figure 10C:
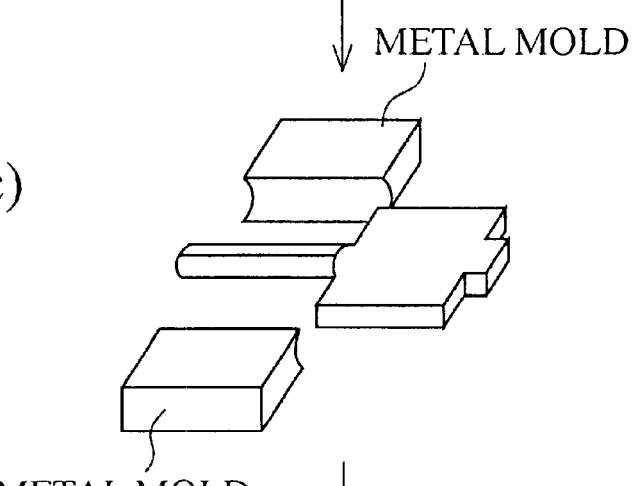
Figure 10D:
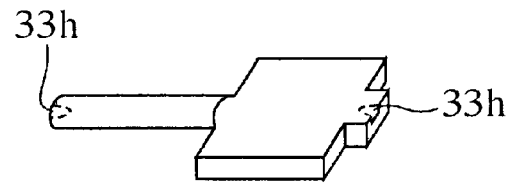

In a step shown in FIG. 10(c), a rolling processing is performed for the other portion of the outlined motor shaft corresponding to the screw portion 33a while placing the other portion of the outlined motor shaft between metal molds, and the other portion of the outlined motor shaft is processed to have a columnar shape. In cases where the other portion of the outlined motor shaft cannot be precisely formed into a columnar-shaped bar by performing the rolling processing only once, it is applicable that the rolling processing be repeatedly performed. In a step shown in FIG. 10(d), a pair of center holes 33h are formed on both ends of the outlined motor shaft according to a hole-making processing or a press processing to perform a form rolling processing described later for the outlined motor shaft.

Figure 10E:
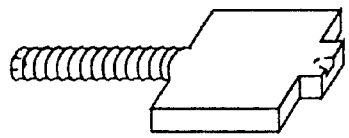

In a step shown in FIG. 10(e), the form rolling processing described later in detail is performed for the outlined motor shaft to roughly form the motor shaft 33, a barrel polishing is performed for the motor shaft 33 to remove flash from the motor shaft 33, and the motor shaft 33 is formed.

Figure 11A:
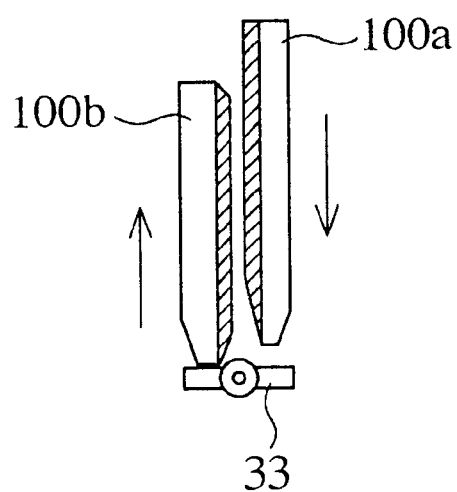
FIG. 11A is an explanatory view of a form rolling step performed as one manufacturing step of the motor shaft shown in each of FIG. 3A to FIG. 3E according to the first embodiment of the present invention.
Figure 11B:
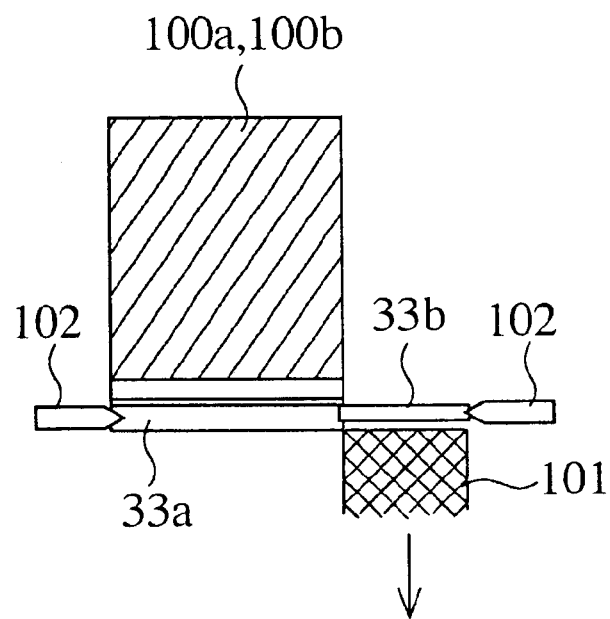
FIG. 11B is another explanatory view of the form rolling step.

FIG. 11A and FIG. 11B are a plurality of explanatory views showing the form rolling processing.

In FIG. 11A and FIG. 11B, 100a and 10b indicate a pair of form rolling plates. A plurality of oblique grooves are formed on a surface of each form rolling plate 100a or 100b. The screw portion 33a of the motor shaft 33 is placed between the form rolling plates 100a and 100b under pressure, the form rolling plates 100a and 100b are moved up and down in the opposite direction to each other, and thread ridges are formed in the screw portion 33a.

Here, before the thread ridges are formed by using the form rolling plates 100a and 100b, the rotation regulating portion 33b is fixed by a positioning tool 101 to perform the positioning of the motor shaft 33 in an axis-around direction (that is, a rotational direction), and two center supports 102 are inserted into the center holes 33h to perform the positioning of the motor shaft 33 in a longitudinal direction of the motor shaft 33.

Next, the procedure of the form rolling operation is described.

The center supports 102 are inserted into the center holes 33h in the longitudinal direction to fix the motor shaft 33, the motor shaft 33 is pressed by the positioning tool 101 in the upper direction, and the positioning of the motor shaft 33 is performed.

Thereafter, the motor shaft 33 is moved toward the form rolling plates 100a and 100b, and the positioning tool 101 is moved in the lower direction before the forming of the thread ridges. Therefore, the motor shaft 33 can be rotated.

Thereafter, the screw portion 33a is rotated while being pressed by the form rolling plates 100a and 100b and while being positioned by the center supports 102 in the longitudinal direction, and thread ridges, of which a rotational phase is uniform, are formed on the screw portion 33a.

As is described above, in the present invention, a manufacturing method of a motor shaft for a rotational-to-direct motion converting motor comprises a step for forming an end portion of a wire rod into a large diameter portion, a step for flattening the large diameter portion to form the large diameter portion into a plate portion having a prescribed thickness, a step for taking out a prescribed-shaped rotation stopping portion from the plate portion having the prescribed thickness, and a step for forming thread ridges on the wire rod other than the rotation stopping portion. Because the wire rod is formed into the rotation stopping portion after the wire rod is once formed into the large diameter portion, a diameter of the wire rod can be reduced.

Also, a manufacturing method of a motor shaft for a rotational-to-direct motion converting motor comprises a step for taking out a prescribed-shaped second plate material including a rotation stopping portion from a first plate material, a step for forming the second plate material other than the rotation stopping portion into a columnar portion by pressing the second plate material, and a step for forming thread ridges on the columnar portion. Because the formation of the thread ridges is performed after the second plate material is formed into the columnar portion, the first plate material can be thinned.

Also, the step for forming thread ridges in the manufacturing method comprises a step for forming the thread ridges according to a form rolling. Therefore, the thread ridges can be rapidly formed.

Also, a motor shaft for a rotational-to-direct motion converting motor comprises a rotation stopping portion formed in a plate shape, a screw portion formed in a columnar shape, and a hole, arranged in an end portion of a motor shaft in a longitudinal direction, for positioning the motor shaft in a form rolling. Therefore, a position shift or a phase shift of the thread ridges formed on the screw portion can be prevented.

As is described above, a motor shaft for a rotational-to-direct motion converting motor and a method of manufacturing the motor shaft according to the present invention are used for a valve (EGR-V) of an exhaust gas re-circulation system and are appropriate to the conversion of a rotational motion of a valve motor into a reciprocating motion (or a direct driving motion).

Also, the motor shaft for a rotational-to-direct motion converting motor and the method of manufacturing the motor shaft are appropriate to the manufacturing of a rotational-to-direct motion converting motor in which a mechanism for converting a rotational motion of a valve motor into a reciprocating motion (or a direct driving motion) is arranged.

What is claimed is:

1. A method of manufacturing a motor shaft for a rotational-to-direct converting motor comprising:

removing a prescribed-shaped second plate material including a rotation stopping portion from a first plate material;

forming the prescribed second plate material, other than the rotation stopping portion, into a columnar portion, wherein said forming comprises pressing the prescribed second plate material; and forming thread ridges on the columnar portion.

2. The method of manufacturing a motor shaft according to claim 1, wherein forming thread ridges comprises:

forming the thread ridges according to a form rolling.

* * * * *